Dec. 28, 1937.   N. SCHNECK   2,103,340
OPTICAL TRIAL FRAME
Filed May 7, 1936   2 Sheets-Sheet 1
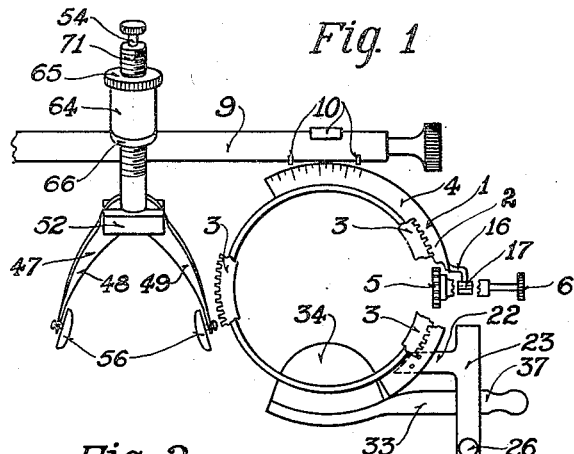
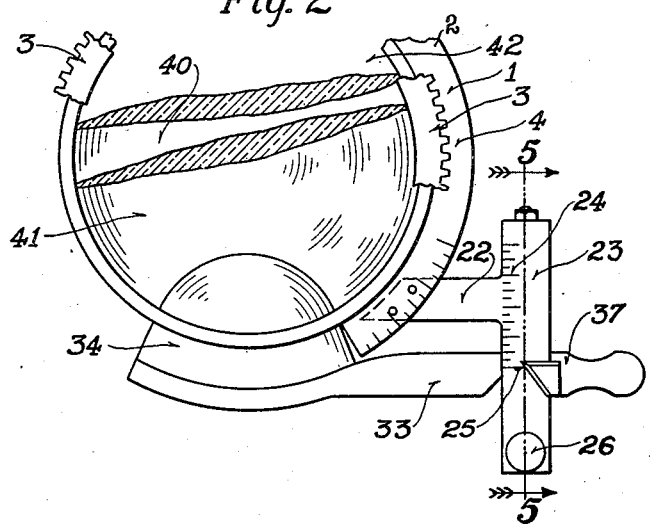
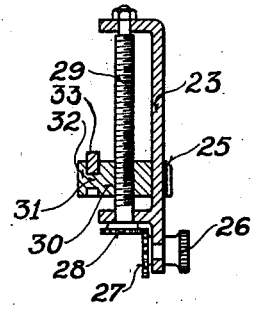
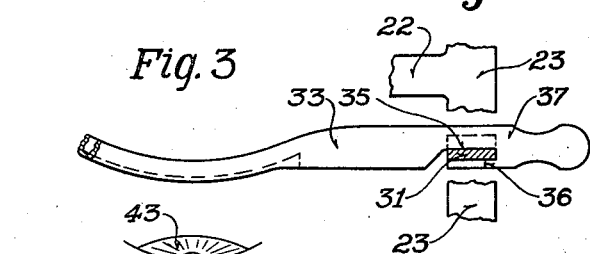
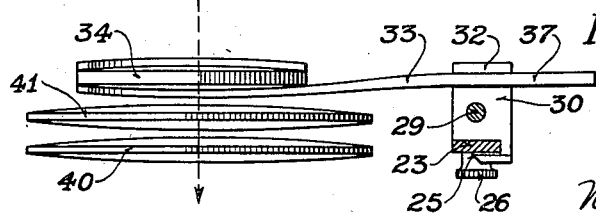
Inventor
Nathan Schneck

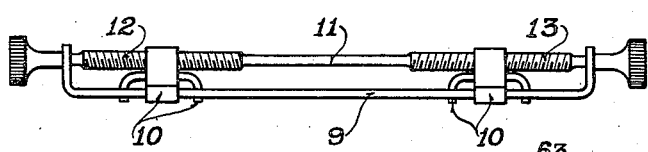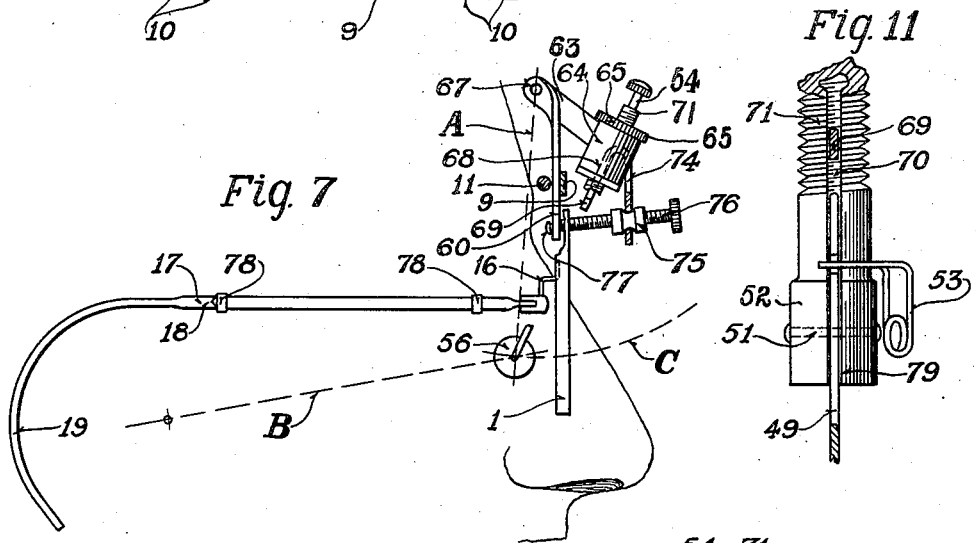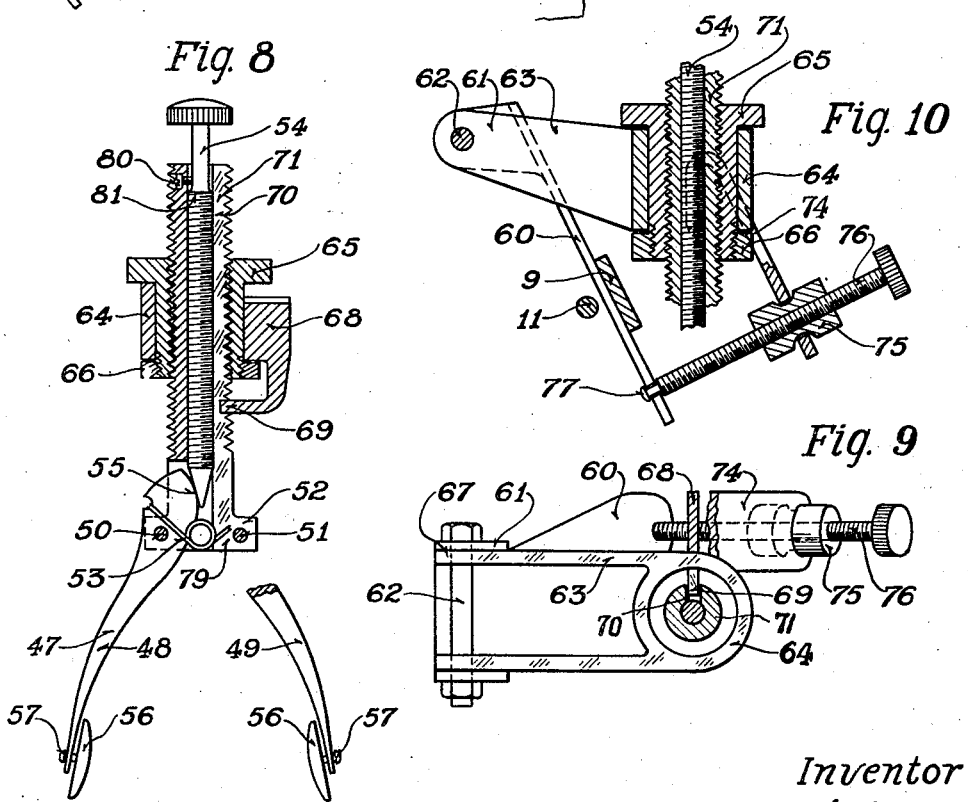

Patented Dec. 28, 1937

2,103,340

UNITED STATES PATENT OFFICE 2,103,340

OPTICAL TRIAL FRAME

Nathan Schneck, Manitowoc, Wis.

Application May 7, 1936, Serial No. 78,312

9 Claims. (Cl. 88—20)

The invention refers to the trial frames which oculists employ in testing patients' eyes to see what spectacles they require to correct their vision, and also to the trial lenses used with such frames.

Such trial frames are usually made with hooks to catch around the patient's ears, as in spectacles, and with the greater part of the weight of the frame supported by the patient's nose, as with spectacles.

For the sake of clearness, one eye only will be spoken of in the following paragraphs, and it is to be understood that the remarks apply to the other also, broadly speaking.

It is usual to provide a ring in front of the eye, carried by the trial frame. Such ring is usually of about the diameter of a spectacle lens, and has around its edge means for holding trial lenses, as many as, say, three at a time, all three of them to be looked through simultaneously by the eye, their aggregate result giving the oculist data which he can combine into a prescription for a single lens for that eye.

When it is desired to prescribe bifocal spectacles the procedure is usually as follows:

First, the oculist will have arrived at his correction for distant vision. To do this he may have put into the frame, perhaps, two lenses. Next, leaving those two lenses undisturbed, and working onward from them, he will add to them a third lens to give him his correction for near vision, the patient then looking through all three of the lenses, and the oculist noting their aggregate result.

In the past, however, it has been the general practice to employ for said near vision correction a lens of the same diameter as the others, filling the whole of the opening of the ring.

But, such third lens has needed to be lifted out again, and again inserted, perhaps several times, when the oculist has wished the patient to return to distant vision, and again to near vision, perhaps several times, in order that the results first arrived at might be either confirmed or improved upon.

Such removal and re-insertion of lenses has not only been a trouble, but it has made impossible a quick succession of glances, as is explained hereinbelow.

The present invention departs from the older practice just described by using, for the near vision correction, not a full-sized lens, but merely a small one.

When such small lens is in position in the trial frame, the patient has before his eye, simultaneously, both his corrections, and is able to employ them selectively. That is to say, he has, in the trial frame, just what he will have in his final bifocal spectacles. Glancing quickly, first downward, then upward again, he will get, at the first moment, his near vision, and, at the next moment, his distant vision, without any pause for the handling of a lens between each such change of glance.

When such quick changes of glance are possible, it is found that the patient guides the oculist much more truly in the matter of selection of lenses, whereby prescriptions more truly suitable to the patient than in the past are arrived at.

Further, it is highly important to determine, not only the right correction for near vision, but also the best height for same. That is chiefly because different heights are desirable for people of different occupations, requiring different elevations of near view. Another reason is that different persons' eyes are lower or higher relative to the most desirable position for their spectacles, and that sometimes even the two eyes of one person are on different levels.

The invention accordingly provides improved means for adjusting the location of the smaller, or bifocal, lenses upward and downward relative to the locations of the larger lenses, and moreover, provides such adjusting means in individual form, for each of a person's two eyes.

The invention further provides improved means for supporting the front part of the trial frame upon the nose, as follows:

Instead of the bridge which has hitherto been used, a fork and nose-pads are employed, the pads fitting at the sides of the nose instead of on the ridge of same. This gives firmness, and definiteness of location, while the oculist adjusts the frame, and while he makes his examination, and also gives comfort to the patient. Without such definiteness of location, the use of small lenses, as described in the earlier part of this introduction, would hardly be practicable.

The invention provides also improved means for adjusting the trial frame as a whole, upward and downward, as also backward and forward, relative to the patient's eyes. This I accomplish by means of what I call a "prop", its footing being the nose pads above described, and its top being hinged to the remainder of the frame. This "prop" contains, in small compass, all the mechanisms needed. Also it has all its adjusting screws convenient to the oculist's fingers.

Details of its construction appear in the description hereinbelow.

In the drawings:

Fig. 1 is a front elevation of the trial frame, broken away at one end.

Fig. 2 is a front elevation of one of the eye-ring assemblies, including bracket carrying a bifocal lens. It is a broken away view with some parts removed.

Fig. 3 is a detail of Fig. 2, broken away.

Fig. 4 is a top view of some of the parts of Fig. 2, showing the patient's eye looking through three lenses at once.

Fig. 5 is a cross-sectional elevation on line 5—5, Fig. 2.

Fig. 6 is a top view of the trial frame, with some parts omitted.

Fig. 7 is a side elevation of the trial frame mounted upon a patient's face, with some parts omitted.

Fig. 8 is a front elevation, partly sectional, of the "prop" assembly, with some parts broken away and some parts omitted.

Fig. 9 is a top plan of the "prop" assembly, broken away.

Fig. 10 is a side elevation partly in section of Fig. 9, with the thimble removed, and with some other parts omitted.

Fig. 11 is a detail of the middle portion of Fig. 9, viewing Fig. 9 from the right.

Referring to the drawings:

Speaking first of some features of known construction:

The eye-ring assembly 1 is made up of the fixed eye-ring 2, Figs. 1 and 2, and of the toothed rotatable ring 3, and of the calibrated dial 4. Such rotatable ring 3 meshes into the pinion 5 which is revolvable by means of the thumb screw 6.

Said eye-ring assembly 1 is the ring through which, in Fig. 1, the left eye of the patient will look. A counterpart of it for his right eye appears in Fig. 7, and it also bears the reference character 1.

The cross-bar 9 crosses the patient's face and carries said two eye-ring assemblies 1, slidable upon it by means of the slide blocks 10, Figs. 1 and 6, which slide blocks are shown in Fig. 6 to be operable by the rod 11, which has right and left threads 12 and 13 respectively, whereby said two eye-ring assemblies 1 may be simultaneously adjusted toward, or from, the middle of said cross-bar 9.

The temple brackets 16, Figs. 1 and 7, carry the two temples 17, each consisting of the shank portions 18 and the ear hooks 19.

The construction so far detailed is according to known design. The features which distinguish the present invention are to be found hereinafter.

Referring more particularly to Figs. 2, 3, 4, and 5:

The bifocal supporting bracket 22 is rigidly attached to said fixed eye-ring 2, and includes the vertical plate 23, having calibrations 24, and carrying upon it the pointer 25, adjustable upward and downward upon it by means of the thumb nut 26, convenient of access to the oculist, which nut, through the medium of gear-wheels 27 and 28, rotates the vertical screw 29, to raise or lower the carrier-block 30, which block has integral with it said pointer 25, and has also upon it a transverse groove 31, Figs. 3 and 5, the outer wall of which is shown at 32, Figs. 4 and 5.

The bifocal arm 33 carries the small lens 34, and has in its lower edge the notch 35; and, at the right-hand end of said notch, as viewed in the drawings, it has the projection 36, Fig. 3. By means of said notch and said projection, said arm is made to catch under and overlie the bottom wall of said groove 31, in which position it remains caught, due to its own weight and the weight of said lens 34 upon it.

At its outward end said bifocal arm 33 has the handle 37, enabling the oculist to remove with ease said arm with its said small lens 34, and to substitute a similar arm carrying another lens of the same size but of different power.

The lenses 40 and 41, Fig. 2, are retained in position by catches of known design, omitted from the drawings. Said lenses 40 and 41 are what I herein call larger, or "full-circle" lenses, meaning that they fill practically the whole of the opening 42 through said eye-ring assembly 1, Fig. 2, whereas said smaller lens 34 is of such area that it can fill only a part of such opening, at the lower portion thereof.

Fig. 2 shows said smaller lens at its lowest position, as is indicated by said pointer 25; but, by means of said vertical screw 29 and the mechanism hereinabove described in connection with same, said smaller lens can be considerably raised above the position shown in that figure.

Fig. 4 shows the patient's eye 43 as looking through all three lenses simultaneously, namely, said smaller lens 34, and said two larger lenses 40 and 41. Thus, the arrangement foreshadowed in the introductory portion of this specification is shown and has been described, namely, an arrangement which permits a smaller lens to be added to one or more larger lenses, all such lenses to be present simultaneously before the patient's eye, whereby the patient can, by quickly altering his glance downward or upward, look, alternately, through all the lenses, or through all but the smaller one.

The reason why this arrangement is desired has been explained in said introductory portion.

Referring now more particularly to Figs. 7, 8, 9, and 10:

The adjustable fork 47 is made up of the legs 48 and 49, pivoted at 50 and 51 into the fork-block 52. The spring 53 tends to hold said legs normally apart, while the fork-screw 54 having a tapered tip, engaging upon the inner rounded edges 55 at the tops of such legs, is employed to force said edges apart, thereby causing the nose pads 56, loosely pivoted to the lower ends of said legs by the pivots 57, to be swung toward each other to fit a narrower nose, the pads being placed in position relative to the nose somewhat as shown in Fig. 7.

Accordingly, the spring is relied upon for spreading the pads apart, but the action of said fork-adjusting screw 54, in bringing the pads toward each other, is a positive action.

The plate 60 is attached to the rear side of the cross-bar 9. At its top spaced plate-lugs 61 are formed, in and between which lugs are hinged, by the hinge bolt 62, prop-arms 63, which are rigid with the collar 64, in which collar the thimble 65 is free to turn. Said thimble is prevented from rising by the lock ring 66.

Accordingly, a complete hinged structure is formed by said plate-lugs 61, said hinge bolt 62, and said prop arms 63, all co-operating. To such hinged structure as a whole the reference character 67 is applied.

The tongue 68, rigid with said collar 64, has its point 69 engaged in the slot 70, running lengthwise of the main screw 71, and thereby prevents said main screw from revolving. The effect, therefore, of revolving said thimble 65 is to cause said main screw 71 to rise or sink, relative to said collar 64 and to said thimble 65.

Integral with said main screw 71 is the fork-block 52, which carries the fork aforesaid. Therefore the effect of raising or lowering said main screw 71, as aforesaid, is to raise or lower said nose pads 56 relative to said hinged structure 67.

The element which I have hereinbefore referred to as a "prop" is an assembly consisting chiefly of said arms 63, said collar 64 with all the parts that it encircles, and the continuations downward from said encircled parts, terminating in said nose pads 56.

Accordingly, the "prop", or "prop assembly", swings as one unit on the hinge bolt 62 relative to the remainder of the frame.

Also, the effect of raising or lowering said main screw 71 as aforesaid is to shorten or lengthen said prop assembly. And, since said nose pads have a definite footing upon the patient's nose as aforesaid, the absolute effect of revolving said thimble 65 is to raise or lower said hinged structure, relative to the patient's face. And, with the hinged structure, said cross-bar 9, and said eye-ring assemblies 1, also are raised or lowered, relative to the patient's face.

Adjustment forward and backward is effected as follows:

As best shown in Figs. 7 and 10, the tongue 68 is bent over at its top to form an arm 74, in which arm a sleeve 75 is tiltably held. Said sleeve 75 is internally threaded to receive the adjusting screw 76, the point of which screw is swivelled in the lower end of said plate 60, as shown at 77, some distance below said cross-bar 9.

Operation of said adjusting screw 76 causes said prop assembly to swing on said hinge bolt 62 relative to the remainder of the frame. Then, because said nose-pads 56 are definitely located upon the patient's nose as aforesaid, the effect of operating such adjustment is to draw the frame as a whole forward or backward, thus adjusting the distance between said eye-ring assemblies 1 and the patient's eyes.

Co-operating in the said adjustment are means 78 (Fig. 7), of known design, for shortening or lengthening said shank portions 18 of said temples 17.

Said slot 70 in said main screw 71 is continued downward and splits said fork-block 52, forming the horizontal slot 79 through said block, Figs. 8 and 11. In said horizontal slot the tops of said legs 48 and 49 are housed. Said spring 53 is, however, preferably placed outside said fork-block, as shown best in Fig. 11.

Said fork-screw 54, which adjusts the distance between the nose-pads 56 as hereinabove described, is threaded axially into said main screw 71. Therefore it necessarily is carried with said main screw in all movements of the latter, and thus it preserves its position relative to said rounded edges 55, undisturbed by any adjustment of said main screw relative to said collar 64. The set screw 80, co-operating with the shoulder 81, formed upon said fork-screw, limits the adjustment upward of said fork-screw relative to said main screw.

Accordingly, in the present application, a prop assembly is shown and has been described which contains within itself the mechanisms needed for three distinct adjustments, namely, adjustment of the width of the fork, and adjustments of the eye-ring assemblies in two respects relative to the patient's eyes, namely, upward and downward, and also forward and backward.

Fig. 7 shows that said hinge bolt 62 is located a substantial distance above said cross-bar 9, and also a substantial distance to the rear of same, as viewed in that figure, that is, as viewed when the frame as a whole is so oriented that said eye-ring assemblies 1 lie in a vertical plane.

The reasons for so locating the hinge are two in number, as follows:

First, so that the dotted line A on Fig. 7, extending downward from the hinge bolt 62 to the nose-pads, shall approach, as nearly as possible, a right angle to the dotted line B, which line extends from the middle of the loop of said ear-hooks 19 to the nose-pads. This is desired in order that an adjustment backward of the nose-pads relative to the frame, along the arc C, which arc is struck from the hinge as centre, shall not involve an appreciable sinking of the frame, and everything it carries, relative to the patient's face.

And, second, so that there may be a substantial distance between the axis of said hinge and said anchoring point 77, at which point said adjusting screw 76 is anchored to the frame, thereby giving an adequate leverage to said screw.

I claim:

1. In an optical trial frame, the combination with a cross-bar and eye-ring assemblies suspended from said cross-bar, of a forwardly extending arm supported at one end thereof by said cross-bar on a horizontal pivot, a collar rigid with the other end of said arm, an internally threaded thimble journaled in and locked against endwise movement relatively to said collar, a screw extending through and having threaded engagement with said thimble, means for locking said screw against turning, a nose-grip attached to said screw, and means for rotating said thimble.

2. In an optical trial frame, the combination with a cross-bar and eye-ring assemblies suspended from said cross-bar, of a forwardly extending arm supported at one end thereof by said cross-bar on a horizontal pivot, a collar rigid with the other end of said arm, an internally threaded thimble journaled in and locked against endwise movement relatively to said collar, a screw extending through and having threaded engagement with said thimble, said screw having a longitudinal slot, means rigid with said collar and engaged with said slot to prevent turning of said screw but permit endwise movement thereof relatively to said collar and thimble, a nose-grip attached to the lower end of said screw, and means for rotating said thimble.

3. In an optical trial frame, the combination with a cross-bar and eye-ring assemblies suspended from said cross-bar, of a forwardly extending arm supported at one end thereof by said cross-bar on a horizontal pivot, a collar rigid with the other end of said arm, an internally threaded thimble journaled in said collar, said thimble having on one end thereof a flange for effecting manual rotation thereof and on its other end a locking ring cooperating with said flange to lock said thimble against endwise movement in said collar, a screw extending through and having threaded engagement with said thimble, said screw having a longitudinal slot, a tongue rigid with said collar having its tip engaged with said slot to prevent turning of said screw but permit endwise movement thereof relatively to said collar and thimble, and a nose-grip attached to the lower end of said screw.

4. In an optical trial frame, the combination with a cross-bar and eye-ring assemblies suspended from said cross-bar, of a forwardly extending arm supported at one end thereof by said cross-bar on a horizontal pivot, a collar rigid with the other end of said arm, an internally threaded thimble journaled in and locked against endwise movement relatively to said collar, a screw extending through and having threaded engagement with said thimble, means for locking said screw against turning, a nose-grip attached to said screw, means for rotating said thimble, and means mounted in said screw for effecting a clamping action of said nose-grip.

5. In an optical trial frame, the combination with a cross-bar and eye-ring assemblies suspended from said cross-bar, of a forwardly extending arm supported at one end thereof by said cross-bar on a horizontal pivot, a collar rigid with the other end of said arm, an internally threaded thimble journaled in and locked against endwise movement relatively to said collar, a screw extending through and having threaded engagement with said thimble, means for locking said screw against turning, a nose-grip fork comprising a pair of legs pivoted on the lower end of said screw, a spring tending to spread said legs, and a screw mounted in and lengthwise of said first-named screw in threaded engagement therewith and operative to cam said legs into clamping engagement with the nose of a patient, said last-named screw being operative without moving said first-named screw.

6. In an optical trial frame, the combination with a cross-bar and eye-ring assemblies suspended from said cross-bar, of a plate secured to said cross-bar and extending above and below the latter, a forwardly extending arm horizontally hinged at its rear end on the upper end of said plate, a collar rigid with said arm, an internally threaded thimble journaled in and locked against endwise movement relative to said collar, a screw extending through and having threaded engagement with said thimble, means for rotating said thimble, means for locking said screw against turning, a nose-grip attached to said screw, an arm rigid with and depending from said collar, an internally threaded sleeve swivelled in said last named arm, and a screw engaged with said sleeve and swivelled in said plate at a point below said cross-bar, said last named screw serving to effect forward and backward adjustment of said eye assemblies.

7. In an optical trial frame, the combination with a cross-bar, eye-ring assemblies suspended from said cross-bar, and temples, of a plate secured to said cross bar and extending above and below the latter, a forwardly extending arm horizontally hinged at its rear end on the upper end of said plate, a collar rigid with the forward end of said arm, an internally threaded thimble journaled in and locked against endwise movement relative to said collar, a screw extending through and having threaded engagement with said thimble, means for rotating said thimble, means for locking said screw against turning, a nose-grip attached to the lower end of said screw and having nose-engaging pads, an arm rigid with and depending from said collar, an internally threaded sleeve swivelled in said last named arm, and a screw engaged with said sleeve and swivelled in said plate at a point below said cross-bar, said last named screw serving to effect forward and backward adjustment of said eye assemblies, and the arrangement being such that the line extending between the hinge of said first named arm and the pads of the nose-grip forms approximately a right angle with a line extending from the center of the ear hooks of the temples to said pads, whereby the forward and backward adjustment of said eye assemblies is effected without causing an appreciable lowering of the frame.

8. In an optical trial frame, the combination with an eye ring, of a supporting bracket for a bi-focal test lens rigidly attached to said eye ring, said bracket including a fixed vertical limb having vertically spaced lateral lugs, a carrier block slidably mounted on said vertical limb between said lugs, an arm mounted at one end thereof on said carrier block and at its other end carrying a seat for said test lens, the structural arrangement of the parts being such that the light passing through said test lens also passes through a portion of said eye ring, and a screw rotatably mounted in said lugs parallel with said vertical limb and having threaded engagement with said carrier block for adjusting said carrier block up and down.

9. In an optical trial frame, the combination with an eye ring, of a supporting bracket for a bi-focal test lens rigidly attached to said eye ring, said bracket including an integral flat vertical limb having a scale on its front side, a carrier block slidably mounted on said vertical limb, an arm removably mounted at one end thereof on said carrier block and at its other end carrying a seat for said test lens, the structural arrangement of the parts being such that the light passing through said test lens also passes through a portion of said eye ring, a pointer on said arm overlying said scale, and a screw rotatably mounted on said bracket and having threaded engagement with said carrier block for adjusting said carrier block up and down on said vertical limb.

NATHAN SCHNECK.